(No Model.)

G. A. DORAN.
VETERINARY DRENCHING HORN.

No. 395,744. Patented Jan. 8, 1889.

WITNESSES:
W. H. Pumphrey.
Van Buren Hillyard.

INVENTOR:
George A. Doran
By R. S. & A. P. Lacey
Attorneys.

UNITED STATES PATENT OFFICE.

GEORGE A. DORAN, OF MENOMINEE, MICHIGAN.

VETERINARY DRENCHING-HORN.

SPECIFICATION forming part of Letters Patent No. 395,744, dated January 8, 1889.

Application filed May 16, 1888. Serial No. 274,038. (No model.)

*To all whom it may concern:*

Be it known that I, GEORGE A. DORAN, a citizen of the United States, residing at Menominee, in the county of Menominee and State of Michigan, have invented certain new and useful Improvements in Drenching-Horns; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to drenching-horns for administering medicine to horses and cattle. This horn overcomes all difficulty and danger that are caused by using a bottle, which the horse naturally resists. In using a bottle it requires one man to choke the animal and another to administer the medicine, and the severe choking to which the animal is subjected does great injury to the throat and windpipe, and is the chief cause of the enlarged throat and cough so common among horses.

The object of my invention is to obviate the difficulties heretofore experienced by those having the care of animals, particularly horses, and to produce a simple, efficient, and inexpensive device by which medicine can be administered to animals with great ease and comparative comfort both to the attendant and to the animal under treatment.

The improvement consists in a horn constructed with two receptacles or compartments, each of which is provided with a tube, one being the medicine-nozzle and the other tube, which is preferably flexible, being the nasal-tube.

The improvement further consists in the novel features and combination of parts hereinafter more fully set forth, and shown in the annexed drawings, in which—

Figure 1:
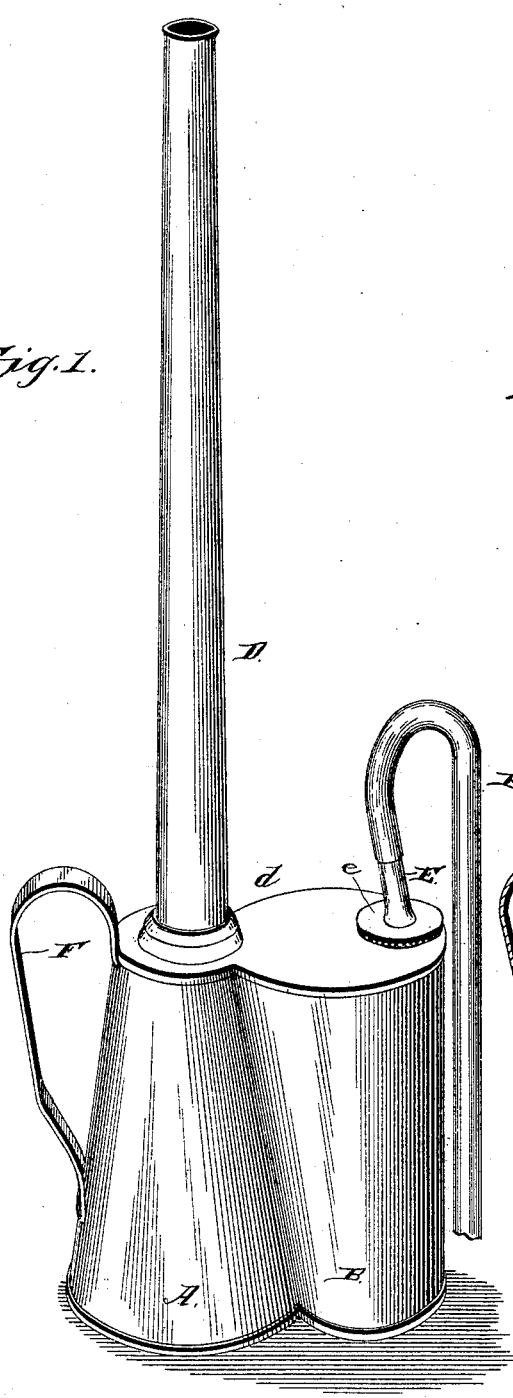
Figure 2:
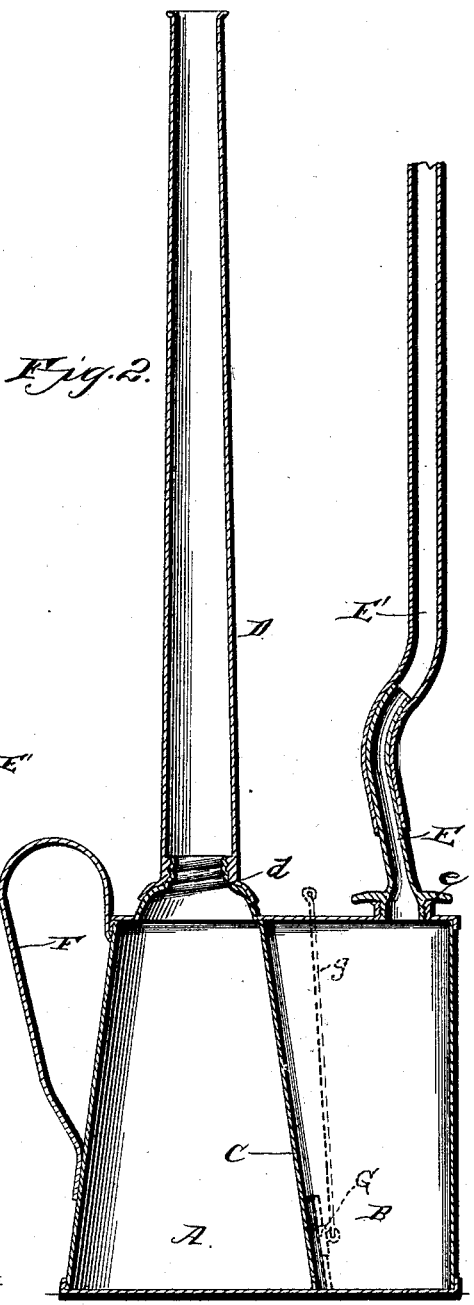

Figure 1 is a perspective view of a drenching-horn constructed in accordance with and embodying my invention, and Fig. 2 a vertical sectional view of the device.

The body of the horn is composed of two receptacles, A and B, placed side by side. The receptacle may form compartments of a single vessel, which is divided by the partition C. The medicine-nozzle D is secured to the receptacle B by a screw-joint, d, so that it can be removed either for filling said receptacle or for substituting another nozzle therefor in case it should become necessary to change the nozzle, which oftentimes is broken by the animal clinching his teeth upon it. The nasal-tube is secured to the receptacle A by a screw-joint, e, and is removable for the purpose of filling said receptacle. It is composed of two tubes, E and E'. The tube E is of rigid material and curved, and the tube E' is of flexible material to permit the free manipulation of the same and prevent its doing injury when inserted in the animal's nose. The handle F affords a grip for the fingers when using the device.

In practice the nasal and medicine nozzles can be removed and the device be packed in a small compass. In using the device the medicine to be administered is placed in the receptacle B, and warm liquid, preferably water, is supplied to the receptacle A. The head of the animal to be drenched is fastened up at the proper angle to allow the medicine to run down not too fast; then insert the medicine-nozzle in his mouth and the nasal-tube in the nostril. The warm liquid flowing into the nostril will cause the animal to swallow the medicine without further trouble.

The two compartments A and B may be in communication through an opening in the lower end of the partition C, which opening is closed by the slide valve or gate G, operated by the rod $g$. In practice the greater part of the water remains in the compartment B, and after administering the medicine the gate G is opened, and the water from the compartment B will flow into the compartment A, which can be rinsed, and the water discharged through the nozzle D, thus cleansing it too.

Having thus described my invention, what I claim, and desire to secure by Letters Patent, is—

1. A drenching-horn composed of two receptacles, each receptacle having a nozzle, substantially as described, for the purpose specified.

2. The herein shown and described drenching-horn, composed of a vessel, the partition dividing the vessel into two receptacles which have communication with one another, the valve for shutting off the communication between the two receptacles, and the nozzles, one for each receptacle, substantially as and for the purpose described.

In testimony whereof I affix my signature in presence of two witnesses.

GEORGE A. DORAN.

Witnesses:
 CHARLES LINE,
 H. H. REED.